United States Patent [19]
Dickie

[11] 3,779,087
[45] Dec. 18, 1973

[54] GYROSCOPE PICKOFF MEANS
[75] Inventor: Robert J. Dickie, Maywood, N.J.
[73] Assignee: The Singer Company, Little Falls, N.J.
[22] Filed: Mar. 30, 1972
[21] Appl. No.: 239,645

[52] U.S. Cl. .............................. 74/5.6, 73/517 AV
[51] Int. Cl. ............................................. G01c 19/28
[58] Field of Search ............................... 74/5.5, 5.6; 73/517 AV

[56] References Cited
UNITED STATES PATENTS

| | | |
|---|---|---|
| 3,630,091 | 12/1971 | Scarborough et al. ......... 73/517 AV |
| 3,319,472 | 5/1967 | Reefman ....................... 73/517 AV |
| 3,439,546 | 4/1969 | Baker et al. ............................ 74/5.6 |
| 3,559,492 | 2/1971 | Erdley ..................................... 74/5.6 |
| 3,526,144 | 9/1970 | Leigh et al. ............................ 74/5.5 |
| 3,382,726 | 5/1968 | Erdley ..................................... 74/5.6 |

Primary Examiner—Manuel A. Antonakas
Attorney—S. A. Giarratana et al.

[57] ABSTRACT

A gyroscope is provided, which has an inner body, an outer body which is displaceable relative to the inner body, a rotor which is disposed inside the inner body, mounting means for positioning the outer body relative to the inner body, and pickoff means for sensing the angular displacement of the outer body relative to the inner body, wherein the pickoff means includes a base member which is fixedly connected to the inner body, a paddle member which is disposed adjacent to the base member and which engages a fluid portion that is trapped in a gap portion of variable thickness disposed adjacent thereto, a spring member which is connected to the paddle member and to the base member, a driving coil which can drive the paddle member at its resonant vibration frequency, and a sensing coil which can sense the vibration frequency of the paddle member.

10 Claims, 6 Drawing Figures

GYROSCOPE PICKOFF MEANS

The present invention relates to a gyroscope having pickoff means, and particularly to a three-axis gyroscope having pickoff means having a sensing member arranged to vibrate at its resonant vibration frequency.

A conventional gyroscope includes, an inner body which has three axes arranged in quadrature, an outer body which is displaceable relative to the inner body, a rotor which is mounted on the inner body, mounting means for positioning the outer body relative to the inner body, and pickoff means for sensing the angular displacement of the outer body relative to the inner body. A conventional pickoff unit comprises a magnet portion which is mounted on the inner body, and a pickoff coil which is mounted on the outer body. One problem with the conventional pickoff unit is that it is not easily adapted to provide a digital output signal.

In accordance with one embodiment of the present invention, a three-axis gyroscope having a spherical inner body is provided, the gyroscope having a pickoff means adapted to provide a digital output signal, the pickoff means having a paddle member, which is arranged to vibrate at its resonant vibration frequency, the paddle member being positioned in a gap, which is disposed between the outer body and the inner body and which contains a fluid and which has a gap thickness that varies in a selective manner, according to the displacement of the outer body relative to the inner body.

Accordingly, it is one object of the present invention to provide a gyroscope having pickoff means, wherein the pickoff means is adapted to provide a digital output signal.

It is another object of the invention to provide a gyroscope having a pickoff means according to the aforementioned object, wherein the gyroscope is a three-axis gyroscope which includes an outer body, an inner body of spherical shape, and a damping fluid disposed between said outer body and said inner body.

It is a further object of the invention to provide a three-axis gyroscope having a pickoff means which is a digital, universal-angle type of pickoff means that can be mounted on either the inner body or the outer body.

According to the present invention, and in fulfillment of the above objects, there is provided a gyroscope including, an inner body, an outer body separated by a gap from the inner body and displaceable relative to the inner body, a damping fluid disposed in the gap, the gap having a variable thickness, a rotor mounted on the inner body, mounting means for positioning the outer body relative to the inner body, and pickoff means for sensing the angular displacement of the outer body relative to the inner body, wherein the pickoff means includes a pickoff unit comprising, a base member, a paddle member disposed in the gap and engaging an adjacent portion of the fluid, a spring member connected to the base member and to the paddle member, a driving coil for driving the paddle member and fluid portion at the resonant vibration frequency thereof, and a sensing coil for sensing the vibration frequency of the paddle member.

Other objects of the invention will become apparent upon reading the following description and accompanying drawings, wherein like parts are designated by like numerals through the several views, and wherein.

Figure 1:
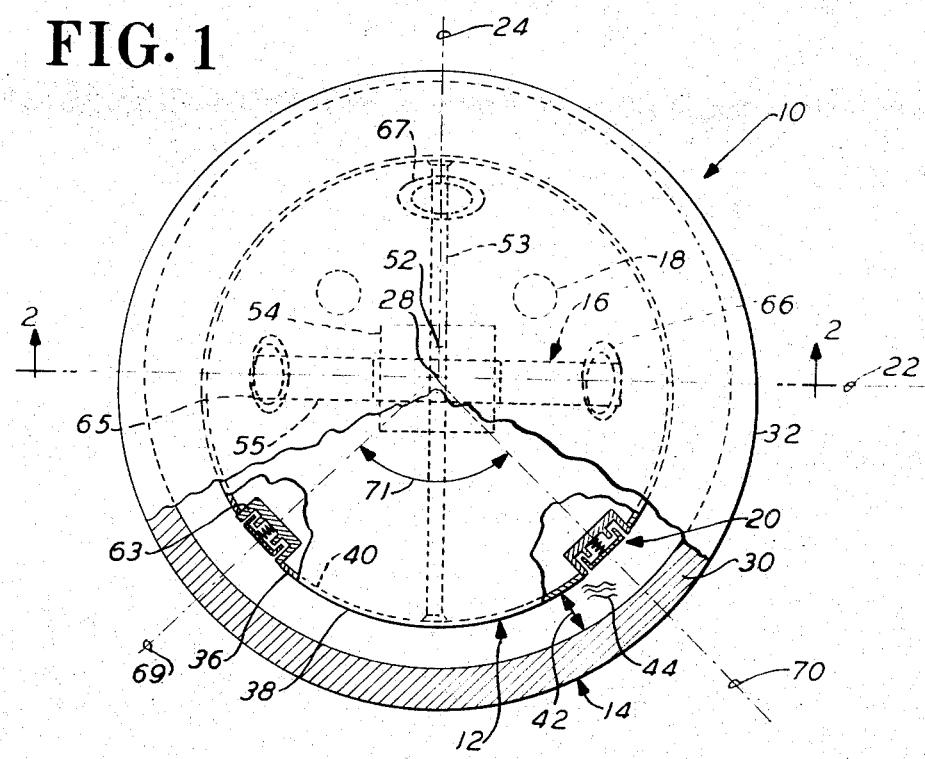
FIG. 1 is an elevation view of a first embodiment of a gyroscope embodying features of the present invention.

Referring to FIG. 1, one embodiment of the present invention is a gyroscope 10, which is a three-axis gyroscope having three degrees of freedom. Gyroscope 10 includes an inner body 12, an outer body 14, which is angularly displaceable reltive to inner body 12, a rotor 16, which is mounted inside inner body 12, mounting or centering means 18 for centering outer body 14 relative to inner body 12, and pickoff means 20 for sensing the angular displacement of outer body 14 relative to inner body 12. Gyroscope 10 is a three-axis type of gyroscope.

Inner body 12 has an x-axis 22, a y-axis 24, which is the rotor spin axis, and a z-axis 26. Outer body 12 is angularly displaceable about axes 22, 24, 26 relative to inner body 12. Axes 22, 24, 26 have a common intersection point, or pivot point 28.

Outer body 14, which is a hollow body, has an outer wall 30 of variable thickness. Outer body 14 has an outer surface 32, which is preferably spherical in shpae. The thickness of wall 30 varies in a defined manner, as explained hereafter. Inner body 12, which is also a hollow body, has an inner wall 36 of substantially constant thickness. Inner body 12 has an outer surface 38, which is preferably spherical in shape, and has an inner surface 40, which may also be spherical in shape. Outer body outer spherical surface 32 and inner body outer spherical surface 38 have respective spherical centers (not shown), which are shown as coinciding with pivot point 21. Outer body 14 and inner body 12, are separated by a gap 42 of selective variable thickness. Gap 42 preferably contains a damping fluid 44. Outer body 14 (FIG. 2) has an upper section 45 and a lower section 46, which are joined together at a construction joint 47. Upper section 45 has an upper inner surface 48, which has a spherical shape that has an offset lower center 49. Lower section 46 has a lower inner surface 50, which has a spherical shape that has an offset upper center 51.

Figure 2:
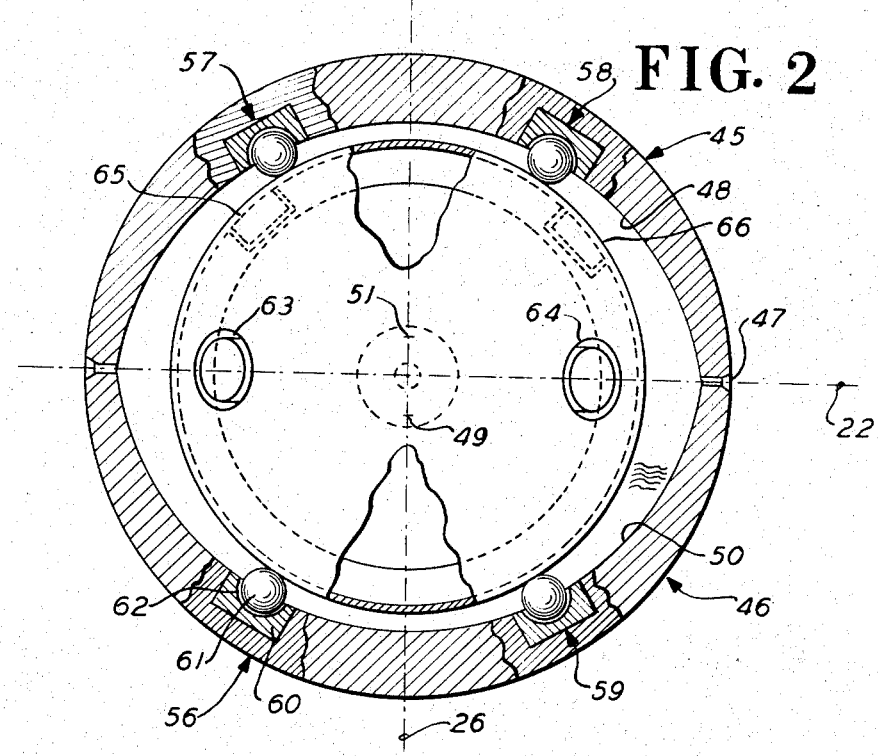
FIG. 2 is a sectional view as taken along line 2—2 of FIG. 1.

Construction joint 47 is disposed in a plane that is located midway between centers 49, 51. For ease of illustration, upper center 51 and lower center 49 are shown in FIG. 2, as points disposed in a plane including z-axis 26. Centers 49, 51 are disposed along an offset axis 52, which is parallel to and offset from z-axis 26, as shown in FIG. 1.

Outer body inner surfaces 48, 50 are approximately circular in profile in the plane including z-axis 22 and y-axis 24. As shown in FIG. 1, offset axis 52 is offset from intersection point 28 along y-axis 24 by a selected distance so that outer body wall 30 has a selected thickness variation, and so that gap 42 also has a selected thickness variation, as shown in FIGS. 1 and 2. Rotor 16 includes a shaft 53, which is fixedly connected to inner wall 36 at either end thereof, a stator 54, which is fixedly connected to shaft 53 at the center portion thereof, and a rotor flywheel 55, which is rotatably supported and driven by stator 54. Shaft 53, stator 54 and flywheel 55 are coaxial along y-axis 24, which is the spin axis. The amount of rotational displacement of outer body 14 about axes 22, 24, 26 relative to inner body 12 can be sensed by pickoff means 20. Inner body 12 and rotor 16 preferably remain stationary as outer body 14 rotates relative thereto.

Mounting means 18 has four ball bearing units 56, 57, 58, 59, which are shown disposed in a plane that is substantially parallel to a plane including x-axis 22 and z-axis 26. Mounting means 18 also includes additional ball bearing units (not shown), which may be disposed in another plane that is disposed substantially parallel to the plane including x-axis 22 and z-axis 26 and on the opposite side thereof.

Bearing unit 56, which is identical in construction to bearing units 57, 58, 59, includes a bed portion 60, which is fixedly connected to outer wall 30. Bearing unit 56 also includes a bearing ball 61, which is supported by bed portion 60 for rotation relative thereto, and anti-friction means 62, which is adapted to minimize the friction between bed 60 and bearing ball 61. Bearing unit 56 applies a radial force against inner body 12 which is directed in a radial inward direction. Although the radial force causes a slight friction force on inner body 12, the amount of such friction force is minimized by anti-friction means 62.

Pickoff means 20 (FIGS. 1 and 2) includes a first pair of pickoff units 63, 64, a second pair of pickoff units 65, 66 and a third pair of pickoff units 67. Pickoff units 63, 64, which are disposed in a plane including x-axis 22 and y-axis 24, sense the angle of displacement of outer body 14 relative to inner body 12 about z-axis 26. Pickoff units 65, 66, which are disposed in a plane including x-axis 22 and z-axis 26, sense the angular displacement about y-axis 24. Pickoff units 67, which are disposed in a plane including y-axis 24 and z-axis 26, sense the angular displacement about x-axis 22. Pickoff units 63, 64, which are typical in arrangement to pickoff units 65, 66 and 67, have respective axes 69, 70, which pass through pivot point 28. Axes 69, 70 have an included angle 71, which is preferably about 90 degrees.

Pickoff unit 63, (FIGS. 3 and 4) which is identical in construction to pickoff units 64, 65, 66, 67, includes a support of base member 72, which is fixedly connected to inner wall 36 and a paddle member 73, which is mounted on base member 72 and which engages a fluid portion 74 that is disposed in an adjacent gap portion 75. Paddle 73 has a spring member 76, which is connected thereto. Pickoff unit 63 also includes a driving device 77 which can drive paddle 73 at its resonant or natural vibration frequency and a sensing device 78 which can sense the vibration frequency of paddle 73.

Sensing device 78 can also sense the change in resonant frequency of paddle 73, which is caused by a corresponding change in the thickness of fluid portion 74 due to a corresponding change in the thickness of gap 75 due to a corresponding angular displacement, of outer wall 30 relative to inner wall 36. Gap portion 75 (FIG. 3) changes in thickness in a selective fashion depending upon the amount of angular displacement about its respective z-axis 26. Pickoff means 20 measures the change in thickness of the corresponding gap portion 75 of each of the pickoff units 63, 64, 65, 66, 67 thereby measuring the angular displacements about each of the axes 22, 24 26 of outer body 14 relative to inner body 12.

Base 60, which is symmetrically disposed about its axis 69, has a peripheral surface 79, which is fixedly connected to wall 36, and has a pair of axially spaced end faces 80, 81. End face 81 has a central recess 82, which receives spring 76, and has an outer annular recess 83, which receives paddle 73. Outer recess 83 has an inner wall 84 of circular shape and an outer wall 85 of circular shape.

Paddle 73 includes a web portion 86, which has a circular profile, and includes an annular flange portion 87. Web 86 bears against spring 76. Flange 87 is composed of a magnetic permeable material for coaction with driving device 77.

Spring 76, which is a helical coil type of spring, has a selective spring rate, which is designed so that spring 76 and paddle 73 can be driven as a unit at their combined resonant frequency, as explained hereafter. Spring 76 is fixedly connected to base 60 at one end thereof and is fixedly connected to paddle 73 at the other end thereof. The value of the resonant vibration frequency of paddle 73 also depends upon the thickness of fluid portion 74, as explained hereafter.

Driving device 77, which is an inner solenoid coil, is wound on recess inner wall 84. Driving coil 77 is adapted to apply a repetitive force to flange 87, to maintain the assembly of paddle 73 and spring 76 and fluid portion 74 in vibration at their resonant frequency.

Sensing device 78, which is an outer pickoff coil, is mounted on the recess outer wall 85 for sensing the frequency of vibration of flange 87. Pickoff coil 78 has a voltage induced therein by the movement of flange 87 which has the same frequency as flange 87. The construction details of solenoid coil 77 and pickoff coil 78 are more fully described in U.S. Pat. No. 3,269,192, issued Aug. 30, 1966, of inventors, Hamilton Southworth, Jr. and John C. Stiles, which is assigned to the same assignee as in this application.

Figure 3:
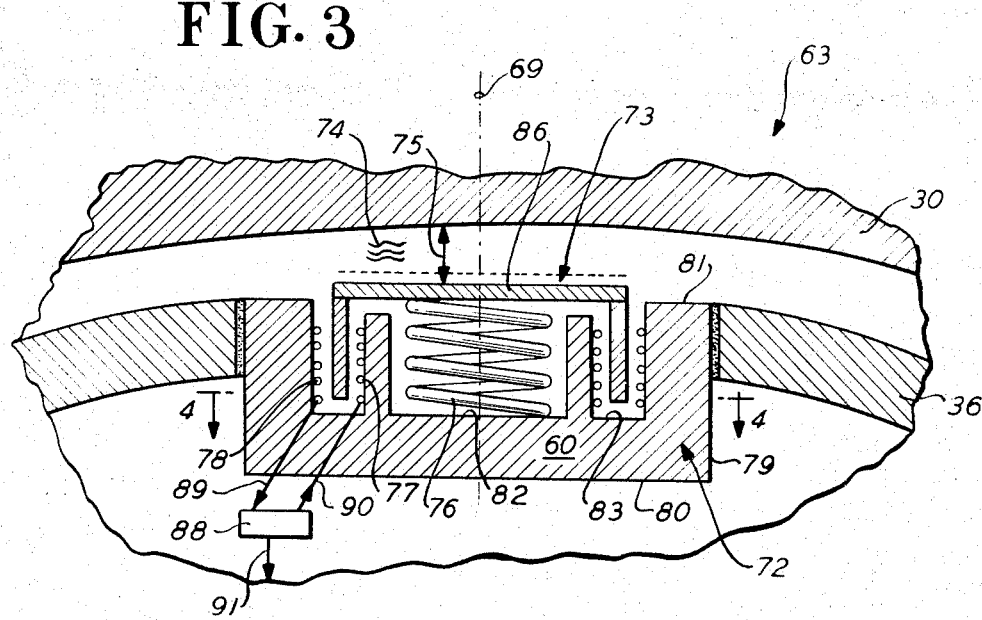
FIG. 3 is an enlarged view of a portion of FIG. 1.
Figure 4:
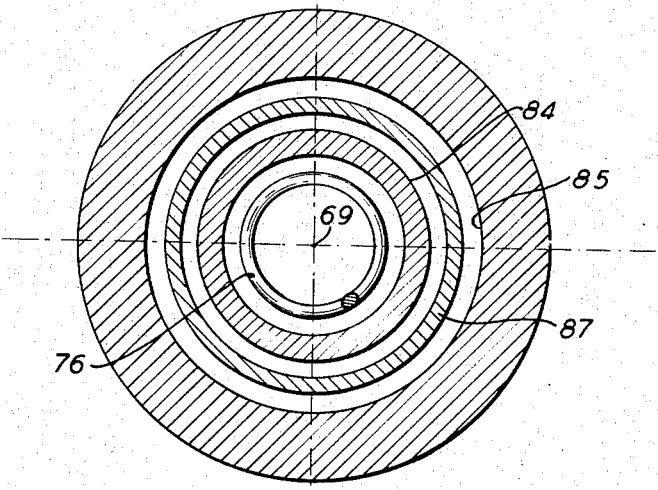
FIG. 4 is a sectional view as taken along the line 4—4 of FIG. 3.

Pickoff means 20 also includes a conventional type of circuit 88, which is shown as a block in FIG. 3. Outer pickoff coil 78 (FIG. 3) has a connecting line 89, which is connected to circuit 88. Inner driving coil 77 also has a connecting line 90, which is connected to circuit 88.

Circuit 88 has a digital output line 91, which can be connected to a counter (not shown) in order to indicate the resonant frequency of the assembly of paddle 73 as a digital number. The construction of circuit 88 conforms to the conventional circuit, as shown and described in U.S. Pat. No. 3,269,192, issued Aug. 30, 1966, of inventors Hamilton Southworth, Jr., and John C. Stiles, and U.S. Pat. No. 3,465,597, issued Sept. 9, 1969, of inventors, Hugh E. Riordan, Leon Weisbord and Jerome M. Paros, and U.S. Pat. No. 3,505,866, issued Apr. 14, 1970, of inventors, Leon Weisbord and Jerome M. Paros, all of which are assigned to the same assignee as in this application. Circuit 88 also has additional connecting lines (not shown), which are connected to the corresponding portions of pickoff units 64, 66, 67.

In operation, paddle 73 vibrates relative to outer wall 30, and displaces the fluid portion 74 in gap portion 75. Paddle 73 with its spring 76 is adapted to vibrate at a resonant frequency, which depends on the characteristics of paddle 73 and spring 76. Fluid portion 74 acts like an additional mass connected to paddle 73. The paddle resonant frequency changes with the size of such fluid mass, which varies inversely with the thickness of gap 75. Thus, the angular displacement of outer wall 30 relative to inner wall 36 causes a change in the thickness of each gap portion 75 which causes a change in the mass of the fluid portion 74 therein, which causes a change in the resonant frequency of paddle 73, which is measured by outer sensing coil 78 and circuit 88 and which is indicated on the digital output line 91.

A mathematical explanation of the action of such fluid portion 74 disposed between paddle 73 and wall 30 is indicated hereafter. Such mathematical explanation indicates that the apparent mass of such fluid portion 74 is inversely proportional to the size of the thickness of gap 75.

The fluid trapped between paddle 73 and wall 30 must flow out at a velocity v (x) in a direction radially outwardly, normal to paddle axis 69, as paddle 73 moves toward wall 30. To move the trapped fluid in this way, paddle 73 must supply the corresponding kinetic energy to the fluid. This kinetic energy acts as a drag or thrust on paddle 73 in the same manner as if an additional mass is attached to paddle 73. The effective additional mass, or apparent mass, may be analytically determined for a paddle with a circular profile, as indicated hereafter.

Kinetic energy of apparent mass =
Kinetic energy of fluid $$\frac{1}{2} M a \dot{y}^2 = \int_0^R \frac{1}{2} (v_{(x)})^2 dm$$

$$dm = \rho dV = \rho(2\pi x dx)s$$

$$v(x) = \frac{Q(x)}{A(x)} = \frac{\pi x^2 \dot{y}}{2\pi x s} = \frac{\dot{y} x}{2s}$$

$$\frac{1}{2} M a \dot{y}^2 = \int_0^R \frac{1}{2} \left(\frac{\dot{y} x}{2s}\right)^2 \rho 2\pi x s dx$$

$$\frac{1}{2} M a \dot{y}^2 = \frac{\pi \dot{y}^2 \rho R^4}{16 s}$$

$$Ma = \frac{\pi \rho R^4}{8} \frac{1}{s}$$

Thus, the apparent mass is inversely proportional to the size of the thickness of gap 75 at paddle 73.

When paddle 73 is supported by spring 76 of stiffness $k$, its resonant frequency in the $y$ direction, or axial direction along axis 69 is:

$$\omega_A^2 = (k/M + Ma)$$

However, $Ma$ can be made large compared to $M$ by the selection of physical dimensions so that the resonant frequency would be:

$$\omega_A^2 = (k/Ma) = 8 k/\pi R^4 \rho \cdot S$$

Other geometric arrangements of paddle 73 and wall 30 will result in other numerical constants, but the resonant frequency will be a function of the spacing, or value of the thickness of gap 75, so that the values of such spacing may be determined by measuring the value of resonant frequency.

The terms used in the above formulas are indicated hereafter.

$M$ = mass of the paddle 73 of circular shape.
$Ma$ = apparent mass caused by trapped fluid within gap portion 75.
$Y = dy/dt$, where $y$ is in a direction parallel to axis 69.
$R$ = radius, normal to paddle axis 69, from paddle axis 69 to outer surface of paddle 73,
$\rho$ = density of trapped fluid 74.
    = radial distance, normal to paddle axis 69.
$S$ = spacing or thickness of gap portion 75 adjacent to paddle 73.
$\omega$ = resonant frequency, cycles per second
$k$ = stiffness factor of spring 76.

Figure 5:
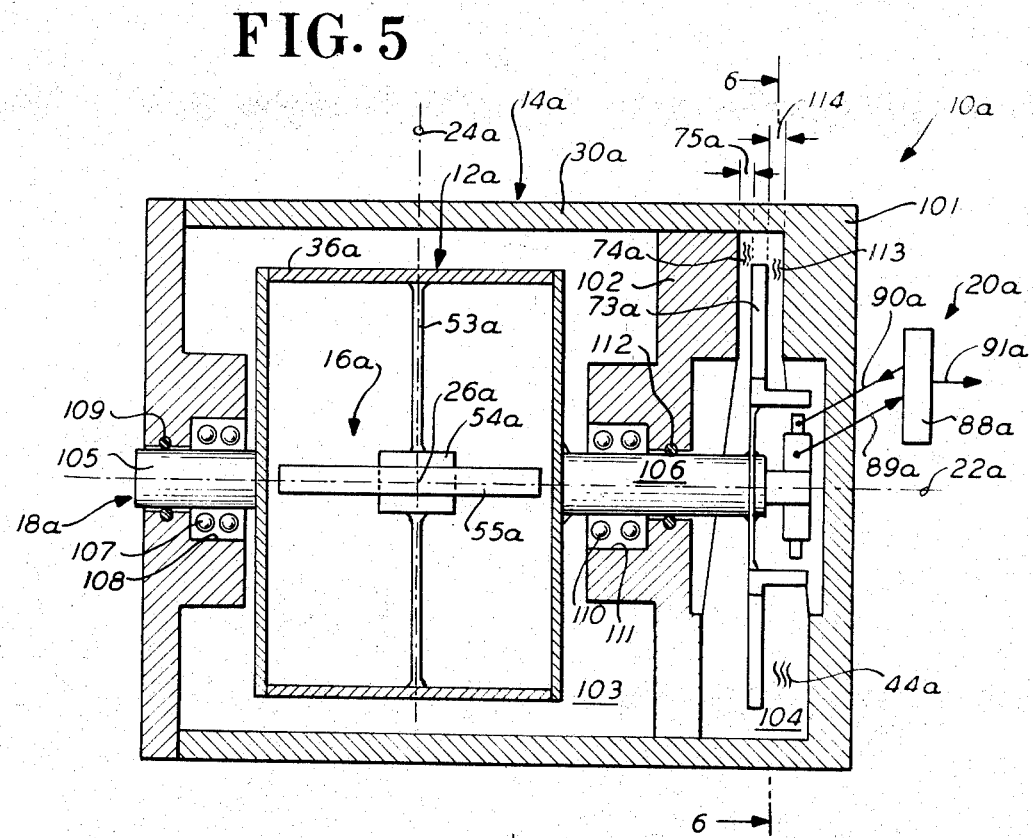
FIG. 5 is a sectional view of a second embodiment of a gyroscope embodying features of the present invention.
Figure 6:
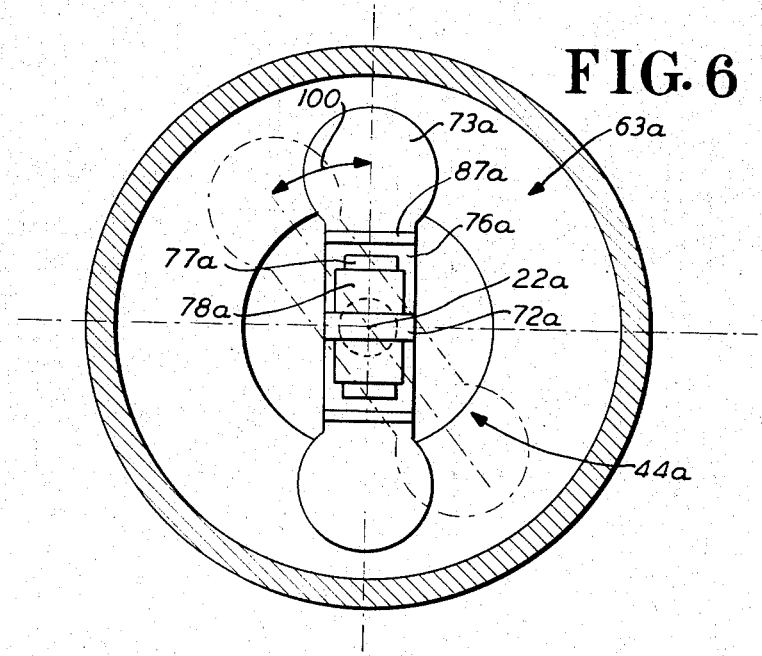
FIG. 6 is a sectional view as taken along the line 6—6 of FIG. 5.

A second embodiment of the invention is shown in FIGS. 5 and 6, wherein like parts are designated by like numerals, but with a subscript $a$ added thereto. The second embodiment 10a, which is a single-axis type of gyroscope, includes an inner body 12a, an outer body 14a, which is displaceable relative to inner body 12a, a rotor 16a, which is mounted inside inner body 12a, mounting means 18a for positioning outer body 14a relative to inner body 12a, and pickoff means 20a for sensing the angular displacement of outer body 14a relative to inner body 12a.

Inner body 12a has an X - axis 22a, which is the output axis, a Y - axis 24a, which is the rotor spin axis, and a Z - axis 26a, which is the input axis. Outer body 14a rotates through an angle 100 about X - axis 22a relative to inner body 12a, as shown in FIG. 6.

Outer body 14a has an outer wall 30a, which has an end wall portion 101 of variable thickness. Outer body 14a also has a partition wall 102 of variable thickness, as explained hereafter. Partition wall 102 forms a first chamber 103 on one axial side thereof and forms a second chamber 104 on the opposite axial side thereof. Second chamber 104, in which pickoff means 20a is disposed, contains a damping fluid 44a. Inner body 12a has an inner wall 36a. Rotor 16a includes a shaft 53a, which is fixedly connected to inner body 12a, a stator 54a and a rotor flywheel 55a, which are coaxial along Y-axis 24a. Mounting means 18a includes a left shaft 105, which is fixedly connected to one side of inner body 12a, and a right shaft 106, which is fixedly connected to the opposite side of inner body 12a. Shafts 105, 106 are axially spaced along X-axis 22a. Left shaft 105 is journaled in a left bearing unit 107, which is received in an opening 108 in outer wall 30a. Left shaft 105 has a seal ring 109, which is disposed adjacent to bearing unit 107. Right shaft 106 has is journaled in a right bearing unit 110 which is received in an opening 111 in partition wall 102. Right shaft 106 has a right seal irng 112, which is disposed adjacent to right bearing unit 110. Pickoff means 20a includes a pair of pickoff units 63a, 64a. Pickoff unit 63a, which is identical in construction to pickoff unit 64a, includes a base member 72a, which is fixedly connected to right shaft 106, and a paddle member 73a, which is mounted on base member 72a, and which engages a left fluid portion 74a that is trapped in a left gap portion 75a, and which also engages a right fluid portion 113 that is trapped in a right gap portion 114. Paddle 73a has a spring member 76a, which is connected to base 72a. Pickoff unit 63a also includes an inner driving coil 77a, which can drive paddle 73a at its resonant vibration frequency, and an outer sensing coil 78a, which can sense the vibraton frequency of paddle 73a.

Paddle 73a preferably has a shape and design so that the mass of damping fluid 44a that is displaced by paddle 73a substantially equals the mass of paddle 73a. In this way, paddle 73a is in a natural bouyancy whereby excitation of paddle 73a by external vibration load is minimized.

Pickoff means 20a is an angle-measuring, digital displacement sensor. Walls 101, 102 on opposite sides of paddle 73a have respective surfaces of helical shape, which are symmetrical about x-axis 22a and which are opposite hand to each other in a developed view thereof. Gaps 75a and 114 are equal to each other and vary simultaneously in a peripheral direction. Paddle 73a has a flange 87a, which is composed of a magnetic permeable material for coaction with driving coil 77a. Spring 76a, which is a flexure type of spring, has a selective spring rate so that paddle 73a with spring 76a can be driven at their combined resonant frequency. Spring 76a is fixedly connected to base 72a at one end thereof and is fixedly connected to paddle 73a at the other end thereof. Base 72a, which is fixedly connected to right shaft 106, supports spring 76a, driving coil 77a and sensing coil 78a, which are fixedly connected thereto. Pickoff means 20a also includes a conventional circuit 88a, which has a connecting line 89a to outer pickoff coil 78a and has a connecting line 90a to inner driving coil 77a. Circuit 88a also has a digital output line 91a. Circuit 88a has additional connecting lines (not shown) which are connected to the corresponding portions of pickoff unit 64a. Circuit 88a has a conventional construction, as explained heretofore.

With the construction of pickoff means 20a, which has two vibrating paddles 73a for measuring the displacement angle 100, the difference in the two respective frequencies of the two paddles 73a can be measured, in place of measuring the absolute frequency of one paddle only, whereby the sensitivity of the pickoff means 20a is improved.

A mathematical formula corresponding to the second embodiment is indicated hereafter.

$$\omega_A^2 = (k/Ma) = (8 \ k/\pi \ R^4 \ \rho) \ (S_1 \ S_2/S_1 + S_2)$$

The terms used in the above formula are the same as the corresponding terms of the formula for the first embodiment, except that there are two spacings $S_1$ and $S_2$ as indicated hereafter.

$S_1$ = spacing or thickness of left gap portion 75a adjacent paddle 73a.

$S_2$ = spacing or thickness of right gap portion 114 adjacent paddle 73a.

With the construction of the second embodiment 10a, wherein there are two spacings $S_1$ and $S_2$ of respective gaps on both sides of paddle 73a, the error caused by tolerance variations arising in machining the sensing surfaces of the adjacent walls 101, 102, is minimized.

In summary, the present invention provides a gyroscope having pickoff means adapted to provide a digital output signal, wherein the gyroscope includes an outer body, an inner body in the shape of a sphere, and damping fluid disposed therebetween, and wherein the entire pickoff means can be mounted on either the inner body or the outer body.

While the present invention has been described in two preferred embodiments, it will be obvious to those skilled in the art that various modifications can be made therein within the scope of the invention. For example, the mounting means 18 can comprise electrostatic means for centering the inner body 12 relative to the outer body 14. In addition, paddle member 73 can be constructed as a vibrating reed member, instead of being constructed as a rigid paddle portion mounted on spring means. It is intended that the appended claims cover all such modifications.

What is claimed is:

1. A gryoscope comprising,
an inner body,
an outer body separated by a gap from the inner body and displaceable relative to the inner body,
a damping fluid disposed in said gap,
said gap having a variable thickness,
a rotor mounted on said inner body,
mounting means for positioning said outer body relative to said inner body, and
pickoff means for sensing the angular displacement of said outer body relative to said inner body, wherein
said pickoff means comprises,
a base member,
a paddle member disposed in said gap and engaging an adjacent portion of said fluid,
spring means connected to said base member and to said paddle member,
driving means for driving said paddle member and said adjacent fluid portion at the resonant vibration frequency thereof, and
sensing means for sensing the value of said resonant vibration frequency.

2. The gyroscope as claimed in claim 1, wherein said base member is fixedly connected to said inner body, and wherein said spring means is an elongate spring member connected at one end thereof to said base member and connected at the other end thereof to said paddle member, and wherein said driving means includes a driving coil for driving the paddle member, and wherein said sensing means includes a sensing coil for sensing the vibration frequency of the paddle member.

3. The gyroscope as claimed in claim 2, wherein said rotor has three axes arranged in quadrature, and said rotor includes a shaft fixedly connected to said inner body and includes a stator mounted on said shaft and includes a flywheel rotatable relative to said stator about one of said axes, and wherein said outer body is angularly displaceable relative to said inner body about at least one of said axes.

4. The gyroscope as claimed in claim 3, wherein said pickoff means includes a circuit having a digital output means, said circuit having a first line connected to said sensing coil, said circuit having a second line connected to said driving coil, said circuit and said sensing coil being adapted to sense the value of said resonant vibration frequency of the paddle member and adjacent fluid portion, said circuit and said driving coil being adapted to drive said paddle member and adjacent fluid portion at said value of resonant vibration frequency of the paddle member and adjacent fluid portion and said circuit and said sensing coil being adapted to sense any change in said value of resonant vibration frequency of the paddle member and adjacent fluid portion.

5. The gyroscope as claimed in claim 4, wherein said pickoff means includes, a pair of pickoff units, each said pickoff unit including a base member fixedly connected to said inner body a paddle member having first and second opposite faces, a first fluid portion disposed in a first gap portion on one side of said paddle member engaging said first face, a second fluid portion disposed in a second gap portion on the other side of said paddle member engaging said second face, a spring member connected at one end thereof to said base member and connected at the other end thereof to said paddle member, a driving coil for driving said paddle member and adjacent first and second fluid portions at the resonant vibration frequency thereof, and a sensing coil for sensing said resonant vibration frequency.

6. The gyroscope as claimed in claim 4, wherein said base member has a peripheral surface fixedly connected to said inner body, said base member having first and second axially spaced end faces, said first end face having a central recess receiving said spring member, said first end face having an annular recess receiving said paddle member, said annular recess having an inner wall supporting said driving coil, said annular recess having an outer wall supporting said sensing coil, and wherein said paddle member includes a web portion arranged to bear against said spring member and includes a flange portion composed of a magnetic permeable material for coaction with said driving coil.

7. The gyroscope as claimed in claim 6, wherein said mounting means includes a plurality of bearing units, each said bearing unit including a bed portion fixedly connected to said outer body and a bearing ball supported by said bed portion and antifriction means disposed between said bearing ball and said bed portion.

8. The gyroscope as claimed in claim 1, wherein said gyroscope is a three-axis type of gyroscope having three degrees of freedom, and wherein said inner body has a spherical shape, said inner body having three reference axes arranged in quadrature, one of said reference axes being the rotor spin axis, said outer body being angularly displaceable about each of said axes relative to said inner body, said outer body being a hollow body enclosing said inner body, said outer body having an outer wall of variable thickness, said outer body and said inner body being separated by a spherical gap of selectively varying thickness, said gap containing a damping fluid, and wherein said pickoff means includes three pairs of pickoff units, said three pairs of pickoff units being mounted on said inner body and disposed in said gap, each said pair of pickoff units being adapted to measure the thicknesses of the pair of fluid portions adjacent thereto thereby measuring the angle of displacement of said outer body relative to said inner body about the respective axis thereof.

9. A pickoff unit for a gyroscope having an inner body having an axis and having an outer body angularly displaceable relative to said inner body about said axis, said pickoff unit comprising, an outer wall portion supported by said outer body, an inner wall portion supported by said inner body, said outer wall portion being positioned relative to said inner wall portion in a selective manner forming a gap therebetween of variable thickness, said gap being symmetrically disposed about said axis, a damping fluid disposed in said gap, a base member fixedly connected to said inner wall portion, a paddle member disposed in said gap, said paddle member engaging a fluid portion disposed in a gap protion adjacent thereto, an elongate spring member having one end connected to said paddle member and having the other end thereof connected to said base member, a driving coil supported by said base member for driving said paddle member and adjacent fluid portion at their resonant vibration frequency, and a sensing coil supported by said base member for sensing said resonant vibration frequency.

10. A gyroscope having three degrees of freedom comprising,
an inner body of spherical shape having first and second and third axes arranged in quadrature,
an outer body separated from said inner body by a spherical gap and being angularly displaceable relative to said inner body,
a fluid disposed in said gap,
a rotor mounted inside said inner body,
mounting means for centering said outer body relative to said inner body, and
pickoff means for sensing the angular displacement of said outer body relative to said inner body, wherein said pickoff means includes a first pair of pickoff units for sensing angular displacement about said first axis and includes a second pair of pickoff units for sensing angular displacement about said second axis and includes a third pair of pickoff units for sensing angular displacement about said third axis, and wherein each said pickoff unit comprises,
a base member,
a paddle member adapted to be vibrated relative to said base member,
a fluid portion disposed in a portion of said gap adjacent to said paddle member, said fluid portion engaging said paddle member so that the value of the resonant vibration frequency thereof depends upon the thickness of said fluid portion,
a spring member of elongate shape having one end connected to said base member and an opposite end thereof connected to said paddle member,
driving means for driving said paddle member and adjacent fluid portion at their resonant vibration frequency, and
sensing means for sensing said resonant vibration frequency.

* * * * *